United States Patent [19]
Hauber et al.

[11] 3,932,738
[45] Jan. 13, 1976

[54] TRANSITION MONITOR FOR A UNIT TRANSITION COUNTER

[75] Inventors: Charles Elwood Hauber, San Jose, Calif.; Stephen L. Vizvary, Punta Gorda, Fla.; Robert E. Simpson; Jerome W. Meyer, both of Santa Clara, Calif.

[73] Assignee: The Singer Company, New York, N.Y.

[22] Filed: Jan. 9, 1975

[21] Appl. No.: 539,682

[52] U.S. Cl. ..... 235/153 AP; 340/146.2; 235/92 EC
[51] Int. Cl.$^2$ G05B 23/02; G05B 1/03; H03K 13/32
[58] Field of Search ................ 235/92 EC, 153 AP; 340/146.2

[56] References Cited
UNITED STATES PATENTS
3,733,472    5/1973    Taisne ...................... 235/92 EC X

*Primary Examiner*—R. Stephen Dildine, Jr.
*Attorney, Agent, or Firm*—Paul Hentzel; James C. Kesterson

[57] ABSTRACT

Input data from an XY encoder stage is continuously monitored and compared to an internally generated count as the stage is adjusted in position. The internal count is generated a single count at a time by transitions in the X-Y input data on the basis that each transition is a one-step change in encoder position. A series of one-step transitions causes both the input data and the internal count to change together, or track. If a single transition is greater than a single encoder step, the input data advances ahead of the internal count and tracking is lost, causing a comparison error. The error halts the monitoring process, activates an alarm, and holds the current input data and internal count for visual comparison in a numerical display. The operator can then remonitor the faulty portion of the stage encoder to determine the nature of the error. The transition monitor is provided with internal testing circuit for counting up and down, changing counting directions, and detecting a prewired multistep test error.

15 Claims, 6 Drawing Figures

Fig. 1

Fig. 2  PANEL CONTROL 18

Fig_3  LOAD CONTROL 32

Fig. 4
ALARM OVER RIDE

Fig_5 TEST CLOCK 60

Fig_6 TEST CONTROL 62

TRANSITION MONITOR FOR A UNIT TRANSITION COUNTER

This invention was made under Government Contract F30602-73-C-0330 with the Department of the Air Force.

BACKGROUND OF THE INVENTION

1. Field of the Invention

This invention relates unit transition counters, and more particularly error detectors for such counters.

2. Description of the Prior Art

Fine positioning along X-Y coordinates of a movable stage is required in aerial photoplates, precision machining and many other applications. Binary code plates along the X and Y axis of the stage provided position information to X and Y encoders for detection and subsequent display. The number displayed does not always accurately reflect the actual stage position. Misalignment between the code plate and the stage axis is a frequent source of error. Electronic failure and even temporary conditions such as gliches can cause spurious data to be displayed. Further, the code plate is subject to internal defects and foreign matter deposition which introduces inconsistencies between the displayed position and the actual position. These errors are primarily noncumulative and can only be detected by slowly scanning the encoder from one position to the next and observing the numerical sequence of display position. An encoder stage 100 millimeters by 100 millimeters with one micron resolution required several hours to individually check 10,000 steps along each axis. This prior art continuity check was burdensome and frequently omitted.

SUMMARY OF THE INVENTION

It is therefore an object of this invention to provide a device for continuously monitoring the transitions of a unit counter.

It is another object of this invention to provide such a monitor which provides an error indication and/or terminates monitoring in response to a multiunit transition.

It is a further object of this invention to provide such a monitor which retains the count of the unit counter responsible for the error.

It is yet another object of this invention to provide an encoder stage monitor which can rapidly perform a code plate continuity check.

It is still another object of this invention to provide a linear encoder monitor which can rapidly detect errors caused by code plate misalignment, dust, defect, scratches, etc.

It is yet a further object of this invention to provide such a monitor with internal test features.

Briefly, these and other objects are accomplished by providing a monitor for a unit transition device such as an item counter or an encoder stage. The monitor generates an internal count for each input transition. The internal count is continuously compared to the input data (the count in the counter or the position of the encoder). Both the input data and internal count may be visually displayed. Inconsistencies between the internal count and the input data activates an error alarm and stops input data. The input data responsible for the error is retained for display.

BRIEF DESCRIPTION OF THE DRAWING

Further objects and advantages of the present monitor and operation thereof will become apparent from the following detailed description taken in conjunction with the drawings in which.

DESCRIPTION OF THE PREFERRED EMBODIMENT

Figure 1:
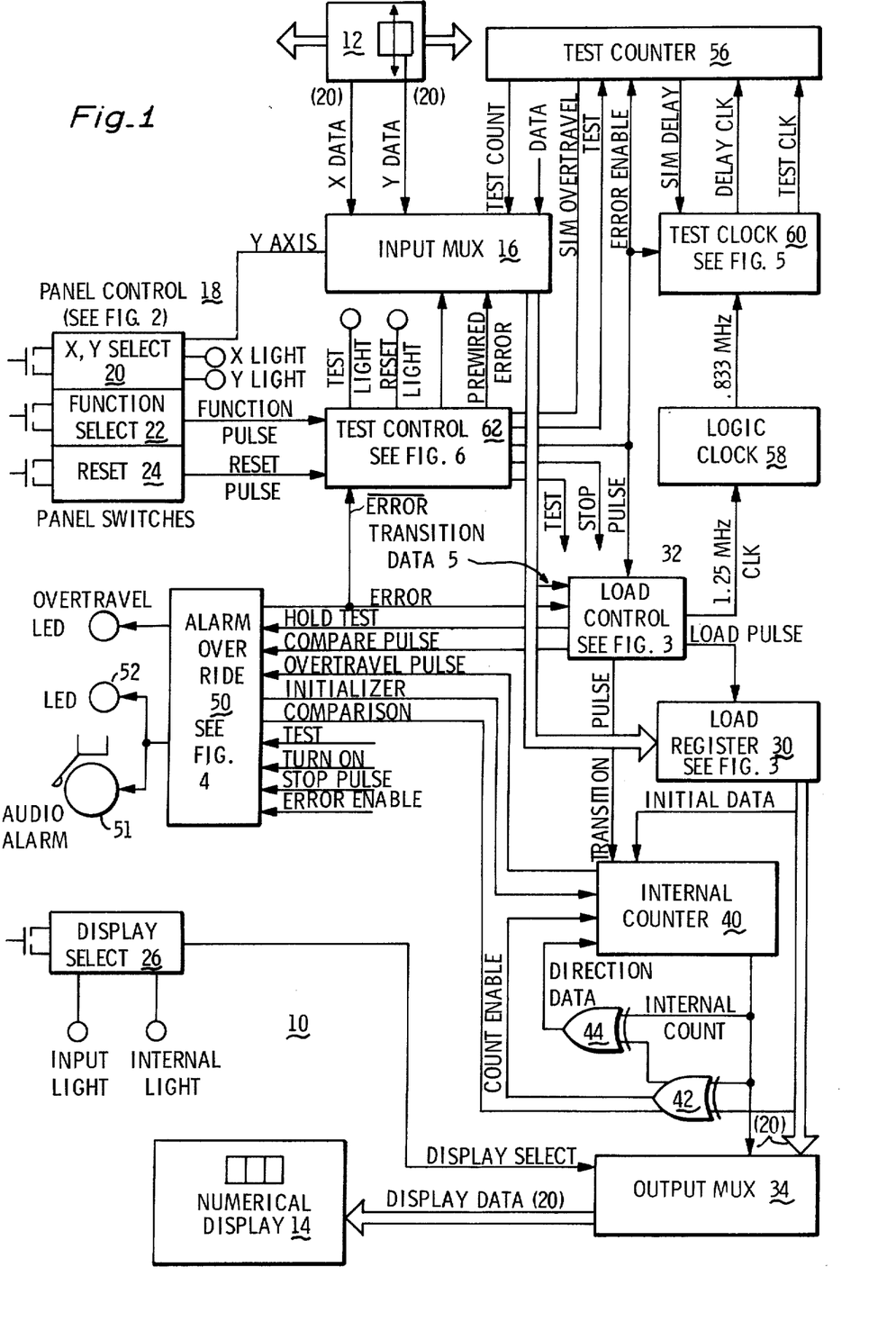
FIG. 1 is a block diagram of monitor system showing data flow and control conditions.

The monitoring system 10 shown in FIG. 1 is responsive to X data and Y data inputs from an XY encoder stage 12. The input data appears on a numerical display 14 as the X or Y coordinate as stage 12 is adjusted. System 10 may be constructed using transistor-transistor-logic (TTL) integrated circuits (IC). The components are described by function, input and output characteristics, and conventional nomenclature as required to permit understanding by one skilled in the logic circuit design art. The component elements are designated by IC type numbers from:

"The TTL Data Book for Design Engineers" from Texas Instruments Incorporated, First Edition, Copyright 1973, unless otherwise specified. Further, all inverters employed are type SN 7404, except LED driving buffers which are type SN 7405, and delay buffers in load control 32 which are type SN 74L04.

Input multiplexer 16 is multiplexer responsive to the Y AXIS state and Function pulses from panel control 20 to receive 20 bits (5 BCD digits) of X input data or Y input data during monitor operation. Multiplexer 16 is responsive to the TEST state of test control 62 to receive 20 bits of test count data during testing of system 10.

Input multiplexer 16 is formed by ten dual 4-line-to-1-line data selectors (SN 74153) connected in parallel with all strobe terminals grounded except to accommodate a prewired error test feature. Preferably the strobe for the most significant bit of the most significant digit is responsive to PREWIRED ERROR state from test control 62.

Panel control 18 (see FIG. 2) activates the features of monitor system 10 through four bistable select circuits, i.e. XY select 20, function select 22, reset 24 and display select 26. These circuits are each activated by a momentary push button switch.

Load register 30 receives current input data from input multiplexer 16 and simultaneously outputs the previous input data in response to load pulses from a load control 32. Load register 30 outputs the 20 bits (5 BCD digits) of input data to an output multiplexer 34 for display, and to an internal counter 40 (initial data) for generating an internal count, and to a comparator circuit 42 for comparison with the internal count. Register 30 is formed by five quad-D flip flops (SN 74175) connected in parallel with a 1K pullup resistor to prevent clear.

Load control 32 (see FIG. 3) is responsive to transition data (changes in the five least significant bits of the input data) from input multiplexer 16 for providing a load pulse to load register 30 at 9.6 microseconds after each input transition. If a subsequent transition in input data occurs within the 9.6 microseconds post transition period, register 30 is not loaded. The post transition period is provided to permit settling of the scanning device in encoder stage 12, and may be adjusted to define the maximum error-free encoder scanning rate, which in this application is 78,125 steps per second. Scanning rates in excess of this value produce multistep transitions in the input data. The internal count increases only by one in response to the multistep change in input data causing a COMPARISON true output from comparator 42 and an ERROR true output from alarm override 50.

Figure 3:
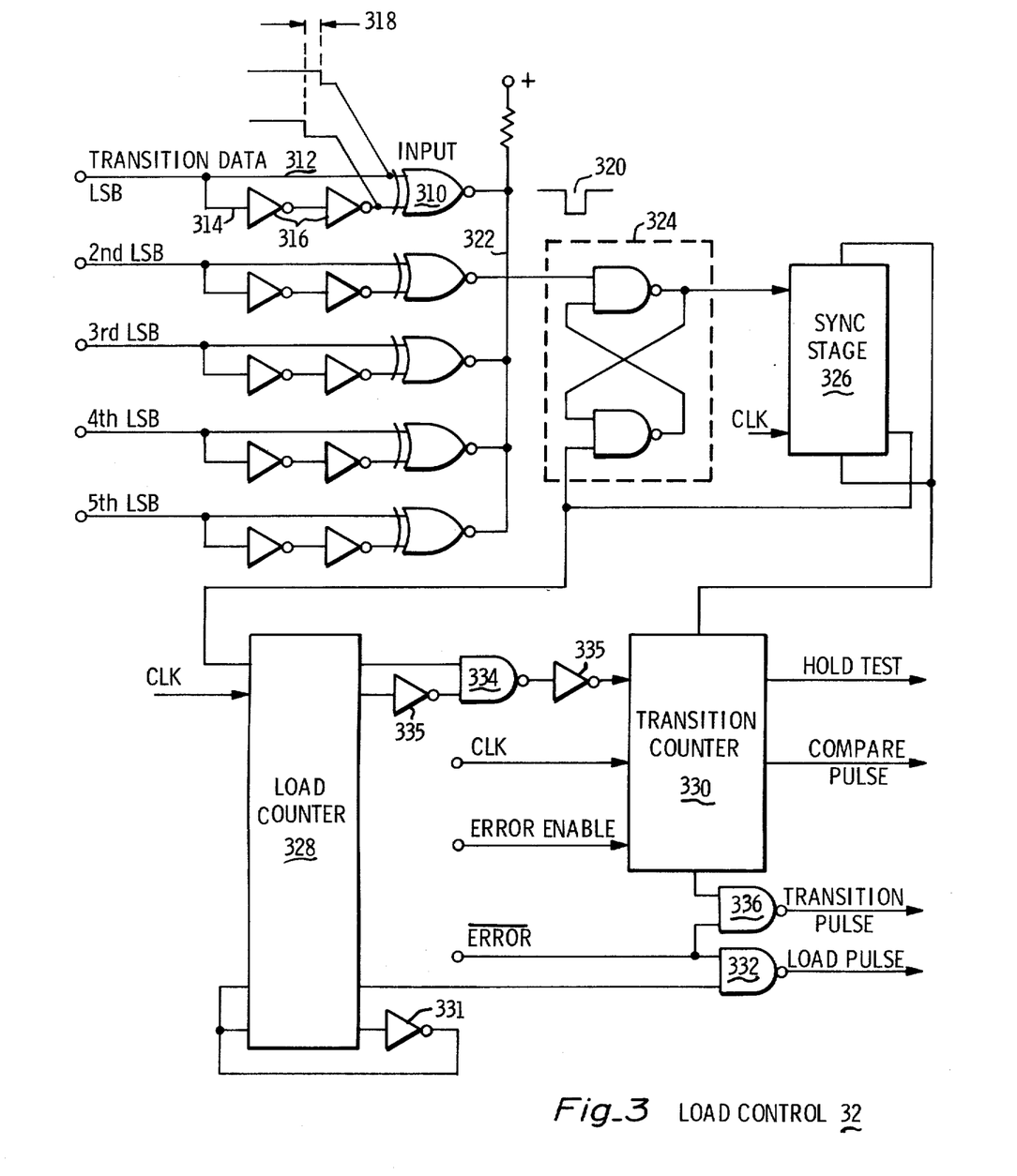
FIG. 3 is a detailed logic circuit of load control 32 showing waveforms associated with transition data.

In the absence of input data transitions, load control 32 activates load register 30 every 12.8 microseconds. The 12.8 microsecond sample period yields a sample rate of 78,125 samples per second subject to the above transition data override. Load control 32 has internal delays for generating the post transition period, and an internal counter for timing the sample period.

Output multiplexer 34 is responsive to display select circuit 26 to receive either 20 bits of input data from load register 30 or 20 bits of internal count from internal counter 40. Output multiplexer 34 provides the display data to five digit display device 14. Output multiplexer 34 is formed by five Quad 2-line-to-1-line data selectors (SN 74157) arranged in parallel with grounded strobes.

Internal counter 40 is responsive to reset circuit 24 to receive 20 bits (5 BCD digits) of initial data from input register 30. Thereafter internal counter 40 generates internal count by one counting in response to unit transition pulses from load control 32. The each one count is incremental or decremental depending on the direction data from direction sensor 44. The internal count from internal counter outputs to output multiplexer 34 and to comparator 42. Internal counter 40 is formed by five synchronous bidirectional decade counters (SN 74190) in parallel.

Comparator 42 first makes a direction sensing comparison and then an error detection comparison. comparator 42 determines the transition direction by comparing the most recently loaded input data from load register 30 to the previously loaded internal count from internal counter 40. After the transition direction is defined and internal counter 40 has counted by one in the proper direction comparator 42 compares the most recent input data to the most recent internal count for error detection. Comparator 42 is formed by 20 exclusive NOR gates (8242 Signetics) wire ORed by digits and having open collectors with a 1K pullup resistor.

Direction sensor OR gate 44 compares the least significant bit 402 of previous internal data from internal counter 40 (see FIG. 4) to the wire ORed output 404 of the three remaining gates of the least significant digit. This comparison determines whether the most recently loaded input data is greater or less than the previous internal data, thus defining the direction of motion. Direction gate 44 outputs direction data to internal counter 40 allowing internal counter 40 to update and present the most recent internal count to comparator 42 for the error detection comparison.

Figure 4:
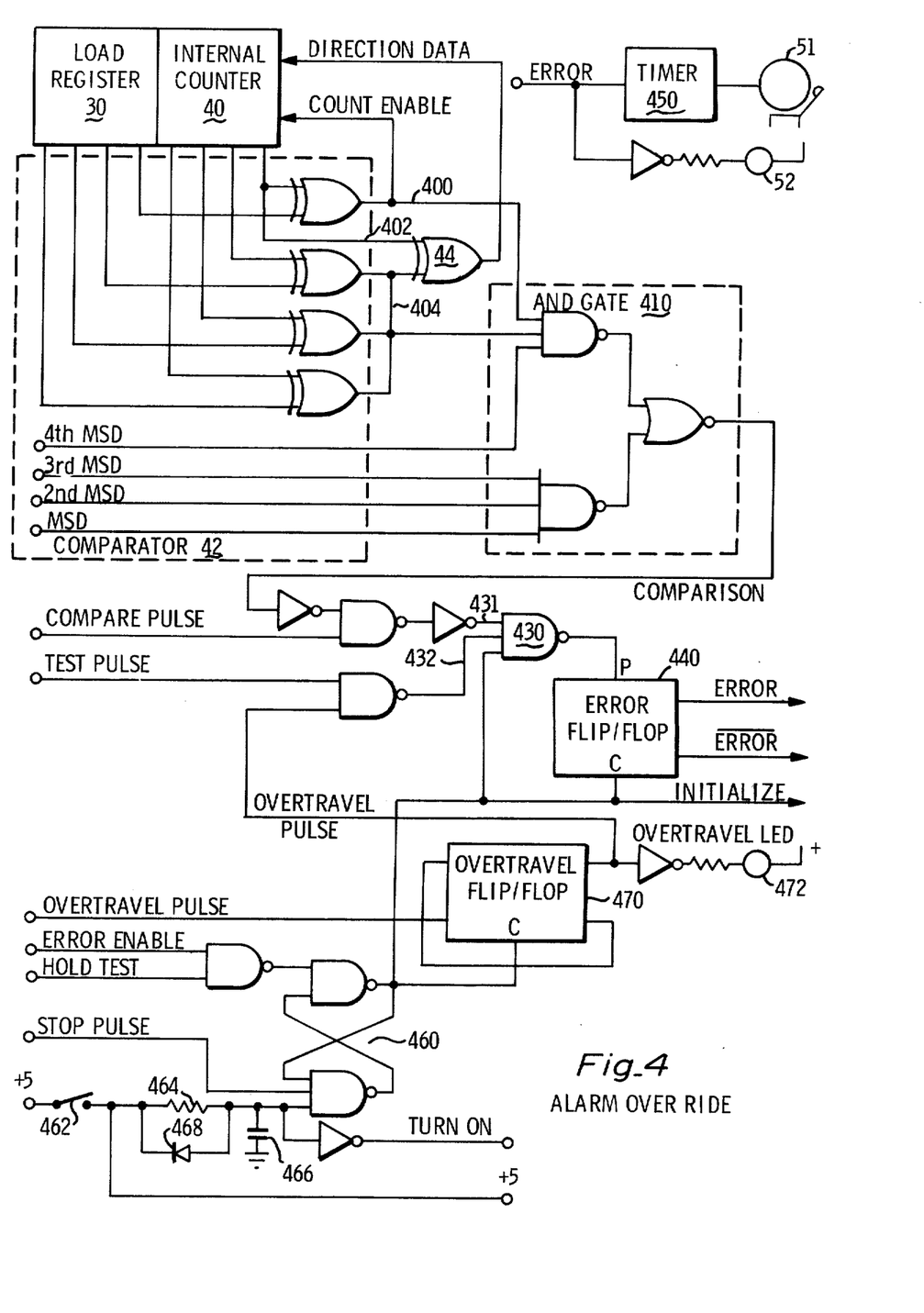
FIG. 4 is a detailed logic circuit of alarm override 50 and a portion of comparator 42.

Alarm override 50 receives the COMPARISON state from a six input AND gate 410 output from comparator 42 (see FIG. 4). Gate 410 gates partial comparison outputs of comparator 42 (the four most significant digits, and the least significant bit 408 of the least significant digit, and the wire ORed output 404 of the three remaining gates of the least significant digit). An error present in any of the 20 bit comparisons will disable AND gate 410 and activate the error alarm. Alarm override 50 has override logic for preventing alarm activation in response to transient errors introduced at startup and changing operational status as shown in FIG. 4.

The alarms may be any suitable audio alarm 51 and/or visual indicator 52 preferably compatible with a 5 volt supply.

Test counter 56 is responsive to test clock 60 for counting from 0 to 99.999 and back to 0 each time ERROR ENABLE is true (see Truth Table). This 20 bit (5 BCD digits) input is received by input multiplexer 16 during ERROR ENABLE true when the X axis is selected. When the Y axis is selected during ERROR ENABLE true, a wired error is received by input multiplexer 16 from test control circuit 62. Test counter 56 is formed by five synchronous bidirectional decade counters (SN 74190) in parallel. The 20 input terminals are grounded, clocking is provided by test clock 60, and the counting direction is provided by test control circuit 62.

Logic clock 58 has a 5 megahertz clock oscillator (910 by Monitor) and provides a 2.5 megahertz intermediate signal, a 1.25 megahertz logic clock output (0.8 microsecond period), and a 0.833 megahertz output (1.2 microsecond period). The 1.25 megahertz output is established by two flip flops (SN 7474) in divide-by-four configuration. The 1.25 megahertz output from the second flip flop is exclusive NORed to the corresponding output of the first flip flop (90° phase displacement) to provide a 2.5 megahertz intermediate output. The 2.5 megahertz intermediate signal from the exclusive NOR gate (8242 by Signetics) is applied to a divide-by-three circuit formed by two flip flops (SN 7474) and a NOR gate (SN 7402) to provide the 0.833 megahertz output. Flip flop clear and preset is prevented by 1K pullup resistors.

Test clock 60 (see FIG. 5) receives the 0.833 megahertz output and divides by 16 to provide a 52.08 kilohertz test clock output (19.20 microsecond period). Test clock 60 also provides a delay clock output which simulates the settling time of encoder stage 12 during TEST mode.

Test control 62 (see FIG. 6) provides the logic interface between function select 22 and reset 24 on panel control 18 and the remainder of monitor system 10 as outlined in the Truth Table.

Figure 2:
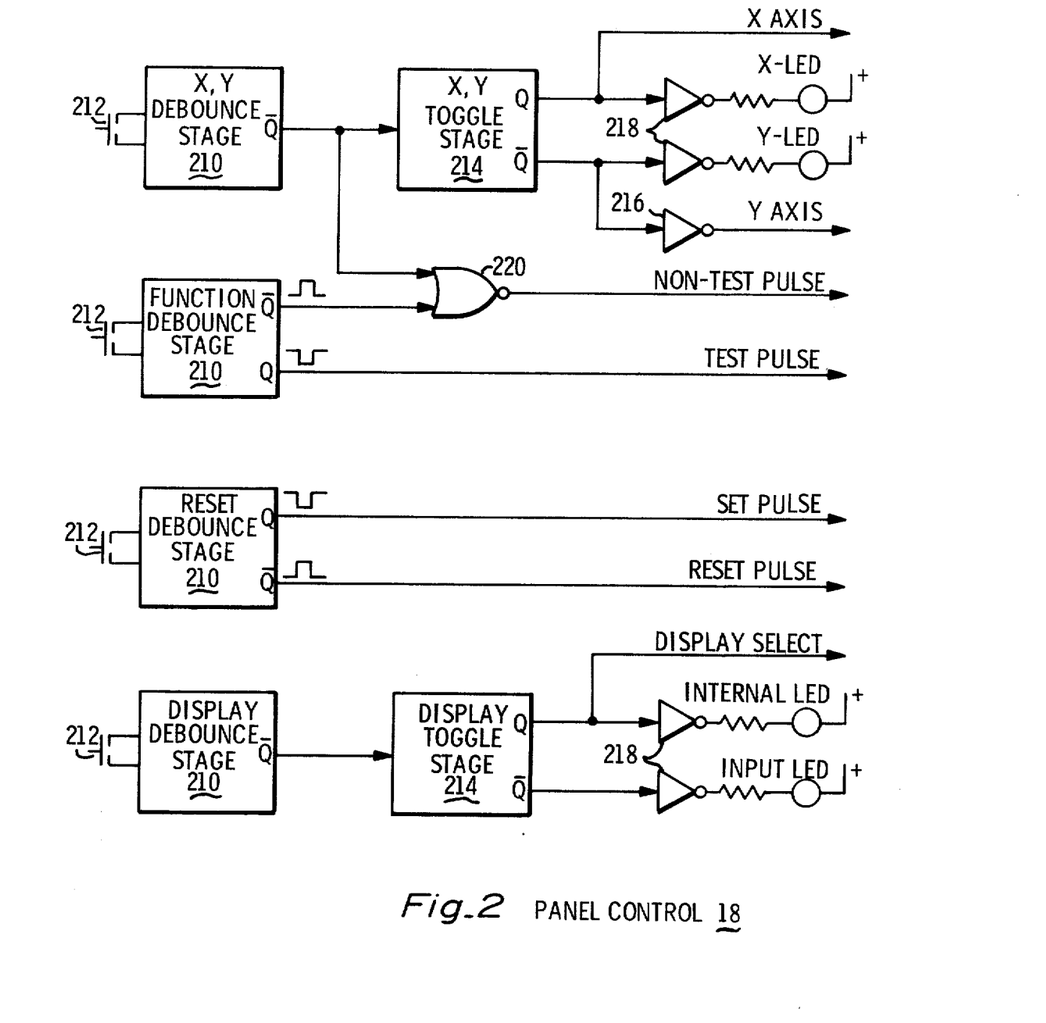
FIG. 2 is a detailed logic circuit of panel control 18.

FIG. 2 shows the select circuits 20, 22, 24, and 26 of panel 18 in more detail. Each select circuit has a debounce input stage 210 responsive to the associated push button switches 212. The debounce stages isolate the circuit from mechanical transients within switches 212. The XY and display debounce stages are followed by toggle stages 214 for providing a bistable condition which expedites selection. The Q output of XY toggle stage 214 provides the X AXIS line and also drives a suitable status indicator such as light emitting diode X-LED. The inverted output (Qbar) or XY toggle stage 214 provides the Y AXIS line through a buffer inverter 216, and drives a corresponding diode Y-LED. The Q output off display toggle stage 214 connects to an input data display LED. The inverted output of display toggle stage 214 connects to an internal count LED and provides the DISPLAY SELECT line. Each LED is preferably interfaced through a drive inverter 218 and provided with a 330 ohm current limiting resistor. Both the debounce stages 210 and toggle stages 214 are preferably formed by flip flops (SN 7474) which connect to push button switches 212 at the clear and preset terminals. These terminals are provided with 1K pullup resistors with the debounce flip flop D and clock inputs grounded. Nor gate 220 is a SN 7402.

FIG. 3 shows load control 32 in detail. Five normally enabled input gates 310 are provided for receiving the five bits of transition data at input leads 312 (the five LSB of the 20 bits of input data from input multiplexer 16). The number of bits of transition data may be more or less than five. Five is preferred in the present example because the five LBS on the code plate of encoder 12 are in a sine function transparency format and are error prone as a unit. The 15 MSB are digitized in an opaque-clear format. Each input lead 312 branches into a delay input 314 formed by a delay device such as low power delay inverter 316. The time delay between the inputs to each input gate 310 provides a transition period 318 of about 30 nanoseconds during which that particular gate 310 is disenabled. A negative transition pulse 320 is thereby provided at common gate output 322. Transition pulse 320 sets a transition latch 324 which outputs to a sync stage 326. Sync stage 326 is clocked to bring the transition information into synchronism with clocked load counter 328 and clocked transition counter 330. The output of sync stage 326 resets latch 324 and restarts counter 328 by clearing. Load counter 328 ring counts (12 clock pulses of 0.8 microseconds each) through a feedback inverter 331 and then provides a load pulse to input register 30 subject to ERROR bar being true as required by a load gate 322. Load counter 328 then starts transition counter 330 through a count decoding circuit (gate 334 and delay inverters 335) after elapse of the post transition period which in this case is 16 clock pulses of 0.8 microseconds of 12.8 microseconds. Transition counter 330 then provides a HOLD TEST pulse to alarm override 50, a transition pulse to internal counter 40 through a transition gate 336, and a compare pulse also to alarm override 50; all separated by at least one clock period. Input gates 310 are exclusive NOR gates (Signetics 8242) with open collector outputs. Latch 324 is formed by two NAND gates (SN 7400) connected in bistable configuration. Sync stage 326 is a D flip flop (SNC 5474J). Decoding gate 334, load gate 332, and transition gate 336 are NAND gates (SN 7400).

FIG. 4 shows in detail alarm override circuit 50 and a portion of comparator 42. When NAND gate 430 has its three inputs, 431, 432, and 433 true, it presets error flip flop 440 into the ERROR true state activating error alarm 51 preferably through a one shot timer 450, and activating error LED 52. Input 431 to gate 430 is true when any input to AND gate 410 is low and a compare pulse is present. That is, the 20 bit comparison within comparator 42 must have at least one set of nonidentical inputs (an error), and load control 32 must have progressed through the proper timing sequence generating a compare pulse. Input 432 to gate 430 is true when TEST is either true or false because OVERTRAVEL is normally false. That is, alarm 51 and LED 52 may be activated when system 10 either is monitoring encoder stage 12 or testing; and OVERTRAVEL only can override alarm 51 and LED 52 when TEST is false (TEST bar True) during monitoring. Input 433 to gate 430 is true when override latch 460 is set by TURNON (which is normally false) and ERROR ENABLE (which is normally true). HOLD TEST is true when power switch 462 is closed. Preferably an RC delay circuit (resistor 464 and capacitor 466) is provided to hold TURNON low or false for a fraction of a second to avoid error alarm due to energization transients. Further, a bypass diode 468 may be provided to discharge capacitor 466 immidiately after deenergization. Stop pulse is momentarily true when any of panel switches 212 are depressed, causing a low at input 433 which clears flip flop 440 to override error alarm 51 and LED 52. HOLD TEST from load control 32 is momentarily true when transition counter 330 is activated by load counter 328. STOP and HOLD TEST prevent spurious changes in system 10 status due to switching transients in panel control 18. ERROR ENABLE is true when stage 12 is being monitored (TEST bar) and during the internal testing cycle (TEST). Both modes of TEST require the alarm feature. ERROR ENABLE is false during the display mode when system 10 merely displays the encoder position without detecting error. ERROR ENABLE false causes input 433 to be low overriding alarm 51 and LED 52. Overtravel flip flop 470 is initially cleared at TURN ON. During system operation flip flop 470 is cleared at each RESET, and toggled by overtravel pulses to activate overtravel LED 472.

Flip flops 440 and 470 may be D type flip flops (SN 7474). Gate 430 and the other three input gates in latch 460 may be NAND gates (SN 7410). The remaining four 2 input gates may be NAND gates (SN 7400). Resistor 464 may be 4700 ohms, capacitor 466 may be 22 microfarads, and diode 468 may be an IN914 type.

Figure 5:
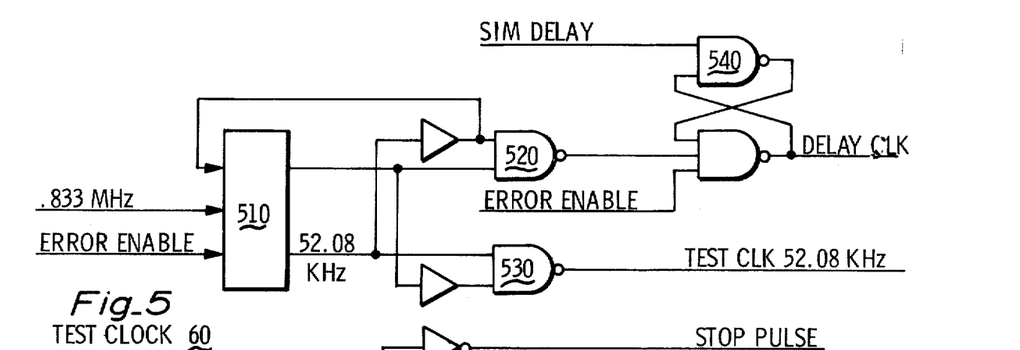
FIG. 5 is a detailed logic circuit of test clock 60.

FIG. 5 shows test clock 60 in detail. The 52.08 KHz outputs (test clock and delay clock) are generated by dividing the 0.833 MHz input by 16 through a shift register 510 connected in inverted ring counter configuration. Gates 520 and 530 form a count decade circuit for establishing a 180° phase shift between test clock and delay clock which prevents simultaneous clocking. Test clock inputs to the LSB of the first decade counter in test counter 56. The output of MSB of the second decade counter provides SIMULATION DELAY to a delay latch 540. Delay latch 540 inhibits delay clock pulses during the time when the two LSD are in a state in which a carry, or barrow, to the next 3 MSD will not occur on the next clock pulse (i.e. 99 counting up or 00 counting down). At this time SIMULATION DELAY is false. When SIMULATION DELAY is true, latch 540 passes the delay clock pulses to the third decade of test counter 56. Delay clock pulses are delayed to simulate the settling time of the detection mechanism of encoder stage 12.

Register 510 may be an 8 bit serial input shift register (SN 74164). Gates 520, 530, and the two input gate of latch 540 540 may be NAND gates (SN 7400). The three input gate input gate in latch 540 may be a NAND gate (SN 7410).

Figure 6:
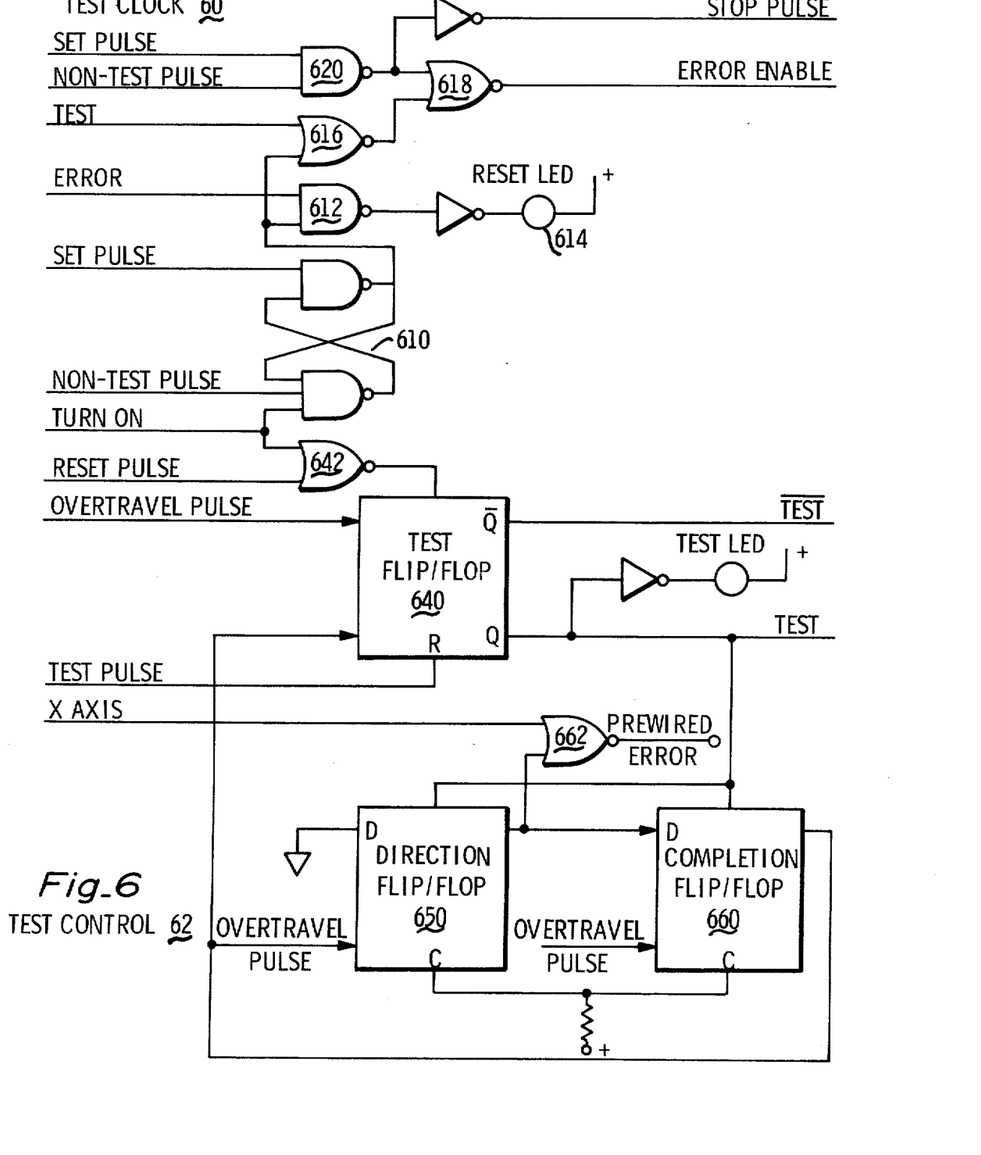
FIG. 6 is a detailed logic circuit of test control 62.

FIG. 6 shows test control 62 in detail. Holding latch 610 is connected to remember the last false input, and is formed by a two input NAND gate (SN 7400) and a three input NAND gate (SN 7410). The normally true output of latch 610 combines with ERROR bar at reset NAND gate 612 to energize reset LED 614. Latch 610 output also combines with TEST at NOR gate 616 to provide one input to test enable NOR gate 618. The other input to NOR gate 617 is provided by set pulse and nontest pulse combined through NAND gate 620. NAND gates 612, 620, and one gate of latch 610 are two input NAND gates (SN 7400). The other gate of latch 610 may be a three input NAND gate (SN 7410). Gates 616 and 618 may be two input NOR gates (SN 7402).

Test flip flop 640 is clocked by overtravel pulses, cleared by TURN ON and reset pulse combined through NOR gate 642, and preset by test pulses. Direction flip flop 650 and completion flip flop 660 are also clocked by overtravel pulse. The output of flip flop 660 clocks test flip flop 64, and the output of flip flop 650 combines with X axis at NOR gate 662 to provide PREWIRED ERROR. Gates 642 and 662 may be NOR gates (SN 7402), and flip flops 640, 650, and 660 are D type flip flops (SN 5474).

is established by selecting Y axis through XY Select 20 and test through function select 22. A positive prewired error test requires about 2 seconds at which time the Test LED extinguishes and alarm LED 52 turns on. At this time input data should be 19.999 and internal count should be 99.999. These values can be checked through display select 26. Monitor X mode is established by first selecting X axis (which generates a Nontest pulse through gate 220, a Stop pulse through gate 620, and ERROR ENABLE becomes False through gate 618), and then clearing by momentarily depressing reset switch 212 (causing ERROR ENABLE to return to true). Monitor Y mode is similarly established by selecting X axis and clearing. Display Only mode is established merely by selecting X axis or Y axis causing ERROR ENABLE to be false.

TRUTH TABLE

|  | TURN ON | Reset | X AXIS | X LED | ERROR ENABLE | SELECT | Test Pulse | Nontest Pulse | Stop Pulse | Test | Test LED | Y LED |
|---|---|---|---|---|---|---|---|---|---|---|---|---|
| Power On | T | F | X | X | F | X |  |  |  | F | OFF | X |
| Clear |  | P | X | X | T | X |  |  | P | F | OFF | X |
| Internal Count |  |  |  |  |  |  |  |  |  |  |  |  |
| X Axis |  | F | T | ON | F | F |  | P | P | F | OFF | OFF |
| Test |  | F | T | ON | T | F | P |  | P | T | ON | OFF |
| Prewired Error |  |  |  |  |  |  |  |  |  |  |  |  |
| Y Axis |  | F | F | OFF | F | T |  | P | P | F | OFF | ON |
| Test |  | F | F | OFF | T | T | P |  | P | T | ON | ON |
| Input (19,999)² |  |  | F |  | T | T |  |  |  | T | ON | ON |
| ¹Int. count (99,999)² |  |  | F |  | T | T |  |  |  | T | ON | ON |
| Monitor |  |  |  |  |  |  |  |  |  |  |  |  |
| X Axis |  | F | T | ON | F | F | P | P | P | F | OFF | OFF |
| Clear |  | P | T | ON | T | F |  |  | P | F | OFF | OFF |
| Y Axis |  | F | F | OFF | F | T | P | P | P | F | OFF | ON |
| Clear |  | P | F | OFF | T | T |  |  | P | F | OFF | ON |
| Display Only |  |  |  |  |  |  |  |  |  |  |  |  |
| X Axis |  | F | T | ON | F | F |  | P | P | F | OFF | OFF |
| Y AXIS |  | F | T | OFF | F | T |  |  | P | F | OFF | ON |

|  | ERROR | Error LED | DISPLAY SELECT | Input LED | Internal LED |
|---|---|---|---|---|---|
| Power On | F | OFF | X | X | X |
| Clear | F | OFF | X | X | X |
| Internal Count |  |  |  |  |  |
| X Axis | F | OFF | X | X | X |
| Test | F | OFF | X | X | X |
| Prewired Error |  |  |  |  |  |
| Y Axis | F | OFF | X | X | X |
| Test | T | ON | X | X | X |
| Input (19,999)² | T | ON | F | ON | OFF |
| ¹Int. Count (99,999)² | T | ON | T | FF | ON |
| Monitor |  |  |  |  |  |
| X Axis |  |  | F | ON | OFF |
| Clear | F | OFF | F | ON | OFF |
| Y Axis |  |  | F | ON | OFF |
| Clear | F | OFF | F | ON | OFF |
| Display Only |  |  |  |  |  |
| X Axis | F | OFF | F | ON | OFF |
| Y Axis | F | OFF | F | ON | OFF |

¹After clear, ERROR becomes true and Error LED turned on upon error detection.
²This number appears on the display.
T — True
F — False
P — Pulse
X — Don't Care

MODES OF OPERATION AND TRUTH TABLE OF CONDITIONS AND EVENTS

Monitor system 10 is energized by closing a power switch 462, and after a short delay TURN ON becomes true. Reset panel switch 212 is momentarily depressed to clear the logic circuits. Internal count mode is established by selecting X axis through XY select 20 and Test, through function select 22. A positive internal count test requires 100,000 counts in each direction which takes about four seconds. Test LED extinguishes at termination of internal count. Prewired error mode This invention is not limited in application to monitoring linear encoders. The present multistep detection system may be used in any unit transition counter, such as counting items on a conveyor belt. A multiitem count, or error, activates an alarm and stops the belt. The operator can then investigate to determine the source of error and the proper count.

As will be apparent to one skilled in the art, the objects of this invention have been accomplished by providing a monitor system for detecting multistep transitions in the position data from a linear encoder. The initial continuity check can be performed automatically and rapidly merely by scanning the code plate with the monitor. An alarm indicates the presence of an error. The operator is not required to observe each change in the displayed position as required by the prior art. In addition, during operation of the encoder, the monitor continuously checks for multistep transactions caused by dust deposition subsequent to the continuity check and by temporary electronic failure or gliches.

The error detection activates an alarm and inhibits further data processing. The encoder position closest to the code plate error is retained of display, thus simplifying locating the faulty portion of the code plate. The multistep detecting circuits cay be conveniently checked by internal count and prewired error test circuits.

We claim as our invention:

1. A device for monitoring numerically sequential input data having unit transitions, comprising:
   input means for receiving the input data;
   at least one internal counter responsive to the input means for changing the internal count data by one unit transition for each transition of the input data;
   comparator for comparing the input data to the internal count data for establishing an ERROR state within the device when the input data is not identical to the internal count data;
   output means for outputting data from the device; and
   a test means for providing test data to the input means, the test means comprising an error circuit for statistically testing the device by providing multistep error data to the input means.

2. The device of claim 1, wherein the error circuit provides a prewired error which affects at least one bit of the input means.

3. The device of claim 2, wherein the prewired error is provided by inhibiting at least one bit of the input means.

4. The device of claim 1, wherein the test means additionally comprises a test counter for dynamically testing the device by providing numerically sequential test count data of unit transitions to the input means.

5. The device of claim 4, wherein the test counter counts clock pulses to provide the test count data.

6. The device of claim 1, further comprising a direction detecting means for controlling the direction of counting of the internal counter.

7. The device of claim 6, wherein the direction detecting means is responsive to changes in the least significant bit of the comparator output.

8. The device of claim 7, wherein the direction sensing means is simultaneously responsive to the least significant bit of internal count data and the wired OR outputs of at least the three next significant bits of the comparator.

9. The device of claim 8, wherein the direction sensing means provides direction data to the internal counter from an exclusive NOR gate which is responsive to the least significant bit of internal count data and the wired OR outputs.

10. The device of claim 6, wherein the test counter is bidirectional for providing numerically sequential test count data which changes in direction for testing the ability of the device to monitor a change in direction of the input data.

11. The device of claim 6, additionally comprising a numerical display means for visually displaying data from the device.

12. The device of claim 6, wherein the input means has a plurality of channels for monitoring a plurality of numerical sequences.

13. The device of claim 12, wherein each channel has an internal counter which counts by units for each transition in the input data of that channel for simultaneously monitoring the plurality of input channels.

14. The device of claim 13, wherein each channel has a comparator for comparing the input data of that channel to the internal count of that channel.

15. The device of claim 14, wherein each channel has a numerical display for simultaneously displaying data in the plurality of channels.

* * * * *